(12) United States Patent
Rzeszutek et al.

(10) Patent No.: US 11,248,675 B2
(45) Date of Patent: Feb. 15, 2022

(54) FRICTIONAL DAMPER AND METHOD FOR INSTALLING THE FRICTIONAL DAMPER

(71) Applicant: General Electric Company, Schenectady, NY (US)

(72) Inventors: Leszek Marek Rzeszutek, Warsaw (PL); Christopher Charles Glynn, Evendale, OH (US); Darek Tomasz Zatorski, West Chester, OH (US); Jakub Jan Broniszewski, Warsaw (PL)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 16/262,222

(22) Filed: Jan. 30, 2019

(65) Prior Publication Data

US 2019/0249738 A1    Aug. 15, 2019

(30) Foreign Application Priority Data

Feb. 13, 2018 (PL) .......................... 424582

(51) Int. Cl.
| | | |
|---|---|---|
| *F16F 11/00* | (2006.01) | |
| *F16F 7/08* | (2006.01) | |
| *F01D 25/04* | (2006.01) | |
| *F01D 11/00* | (2006.01) | |
| *F16L 55/04* | (2006.01) | |

(52) U.S. Cl.
CPC .............. *F16F 7/08* (2013.01); *F01D 11/003* (2013.01); *F01D 11/005* (2013.01); *F01D 25/04* (2013.01); *F16L 55/041* (2013.01); *F05D 2240/55* (2013.01); *F05D 2260/96* (2013.01); *F16F 2222/04* (2013.01); *F16F 2226/04* (2013.01); *F16F 2230/30* (2013.01)

(58) Field of Classification Search
CPC ........ F01D 9/023; F01D 9/065; F01D 11/003; F01D 11/005; F01D 11/25; F02C 7/28; F16F 7/08; F16F 7/095; F16F 7/087; F16F 13/02; F16F 13/04; F16F 2222/04
See application file for complete search history.

(56) References Cited

U.S. PATENT DOCUMENTS

| | | | | |
|---|---|---|---|---|
| 4,438,939 | A | * | 3/1984 | Pask .................... F01D 11/025 277/644 |
| 4,696,618 | A | | 9/1987 | Fairchild et al. |
| 4,703,939 | A | | 11/1987 | Wentworth |
| 5,311,734 | A | | 5/1994 | Pope et al. |
| 8,137,071 | B2 | | 3/2012 | Caucheteux et al. |
| 9,121,299 | B2 | | 9/2015 | Giametta |
| 9,255,487 | B2 | | 2/2016 | Mayer et al. |
| 9,297,312 | B2 | | 3/2016 | Chuong et al. |
| 9,435,266 | B2 | | 9/2016 | Sutterfield et al. |

(Continued)

FOREIGN PATENT DOCUMENTS

| | | |
|---|---|---|
| CN | 101294501 A | 10/2008 |
| CN | 201747841 U | 2/2011 |

(Continued)

*Primary Examiner* — Nicholas J Lane
(74) *Attorney, Agent, or Firm* — McGarry Bair PC (57) ABSTRACT

The present application relates to a frictional damper, a frictional damper assembly and method for installing the frictional damper. The frictional damper comprises a split ring; and a disk spring positioned against the split ring and tensioned by the split ring in an installed state.

22 Claims, 8 Drawing Sheets

(56) References Cited

U.S. PATENT DOCUMENTS

| | | | |
|---|---|---|---|
| 2004/0154303 A1 | 8/2004 | Mitchell et al. | |
| 2013/0149129 A1 | 6/2013 | Matsuyama et al. | |
| 2015/0354386 A1 | 12/2015 | Chuong et al. | |
| 2016/0222812 A1* | 8/2016 | Sippel | F01D 11/08 |
| 2017/0204789 A1* | 7/2017 | Gallet | F02C 9/52 |

FOREIGN PATENT DOCUMENTS

| | | |
|---|---|---|
| CN | 106286663 A | 1/2017 |
| CN | 106352002 A | 1/2017 |
| CN | 106369094 A | 2/2017 |
| DE | 3716680 A1 | 12/1988 |
| JP | H10267081 A | 10/1998 |
| KR | 101398365 B1 | 5/2014 |

\* cited by examiner

Inserting a disk spring onto an inner seat of an inner conduit. — 500

Pushing a split ring around between an outer seat of an outer conduit and the disk spring until the split ring snaps in place fully around the disk spring, such that the disk spring is tensioned by the split ring, and the disk spring and the split ring are in an installed state between inner conduit and the outer conduit. — 501

Allowing a relative movement on at least one slip surface in the installed state, the at least one slip surface positioned at least between the split ring and the disk spring and perpendicular to an axial direction defined by the frictional damper. — 502

FIG. 10

FRICTIONAL DAMPER AND METHOD FOR INSTALLING THE FRICTIONAL DAMPER

CROSS-REFERENCE TO RELATED APPLICATION

This application claims priority to Polish Application No. P.424582, filed Feb. 13, 2018, which is incorporated herein by reference in its entirety.

FIELD OF THE INVENTION

The field of the present invention relates generally to dampers and, more particularly, to frictional dampers.

BACKGROUND OF THE INVENTION

Various traditional dampers have been utilized for some machines or devices, such as turbomachinery, to provide damping of vibrations. Desirably, such dampers may provide vibrational damping as well as sealing functions.

Gas turbine components are required to operate efficiently during operation and flight. Components within the gas turbine aid in protecting operation and allow for operation at a high speed. Engine components require proper sealing to operate efficiently as well as reduce damage to the engine. Rotation of engine component, pressure forces, as well as combustion in combustor of the turbomachinery can create vibrations which may cause engine wear and thus reduce the engine efficiency. Therefore, many dampers have been proposed, such as dampers with spring preloaded, to minimize vibration and/or provide seal for a rotating or static components. However, these traditional dampers are costly, complex, and/or difficult to assemble.

Therefore, there is a need to provide dampers with low cost, and enhancing the simplicity of the assembly while maintaining significant damping.

SUMMARY OF THE INVENTION

The present invention provides an improved frictional damper including a split ring and a disk spring tensioned by the split ring in an installed state. Aspects and advantages of the invention will be set forth in part in the following description, or may be obvious from the description, or may be learned through practice of the invention.

In accordance with aspects of the present specification, a frictional damper is provided. The frictional damper comprises a split ring; and a disk spring positioned against the split ring and tensioned by the split ring in an installed state.

In accordance with another embodiment of the present specification, a conduit assembly is provided. The conduit assembly comprises an outer conduit including an outer seat; an inner conduit including an inner seat and coupled with the outer conduit; a split ring; and a disk spring positioned against the split ring and tensioned by the split ring in an installed state; wherein the split ring is placed between and contact with the disk spring and the outer seat of the outer conduit, and the disk spring is placed between and contact with the split ring and the inner seat of the inner conduit.

In accordance with yet another embodiment of the present specification, a method of installing a frictional damper is provided. The method of installing a frictional damper comprises: inserting a disk spring onto an inner seat of an inner conduit; pushing a split ring around between an outer seat of an outer conduit and the disk spring until the split ring snaps in place fully around the disk spring, such that the disk spring is tensioned by the split ring, and the disk spring and the split ring are in an installed state between the inner conduit and the outer conduit.

DETAILED DESCRIPTION OF THE INVENTION

Reference now will be made in detail to exemplary embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. The terms "forward" and "aft" refer to relative positions in a conduit assembly.

Figure 2:
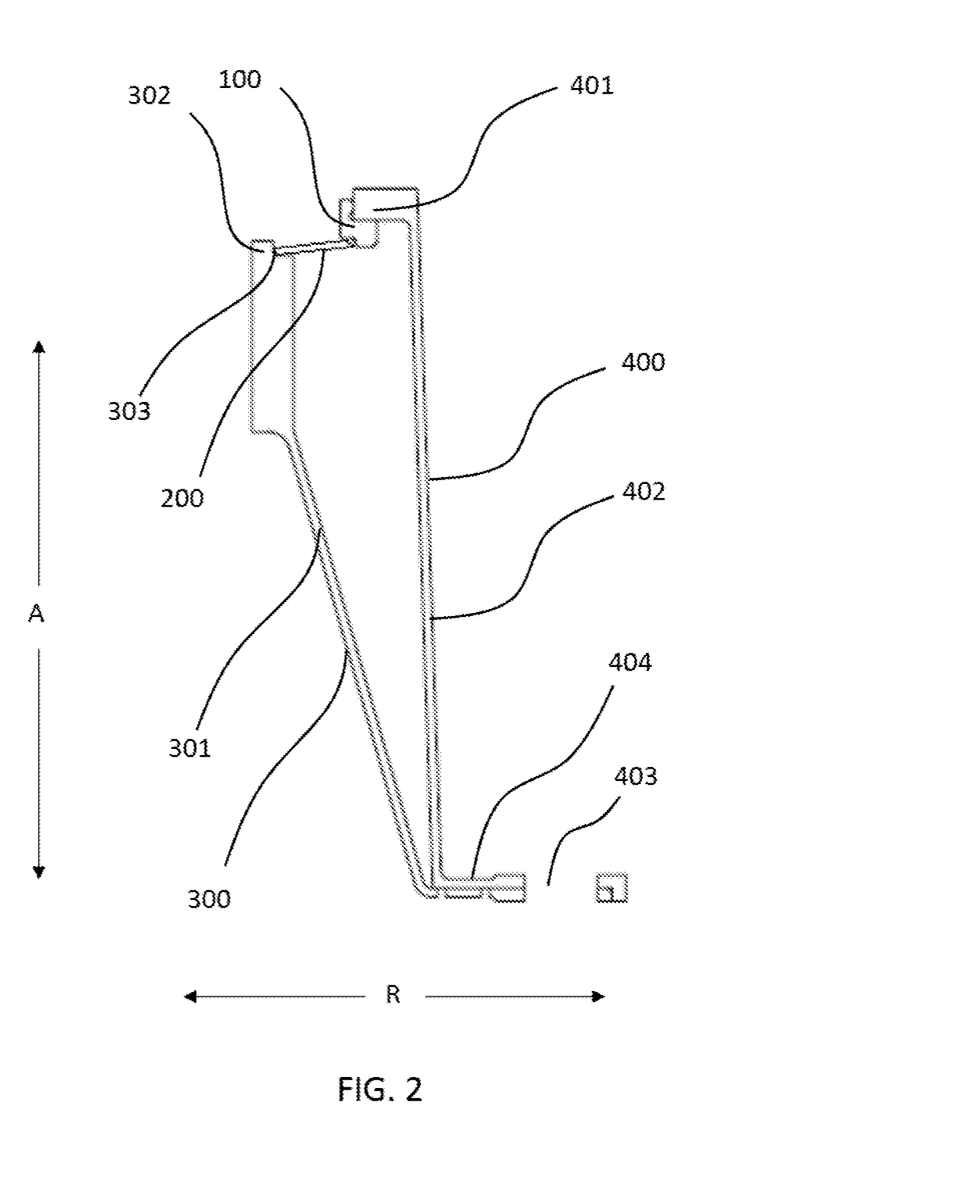
FIG. 2 is a cross-sectional view of a portion of the conduit assembly shown in FIG. 1 and taken along line B-B.

The exemplary assembly and method described herein overcome at least some disadvantages of known dampers by providing a frictional damper that is easy to install, low cost, and may be installed without a need to modify the existing hardware, as well as maintain significant damping and/or sealing. More specifically, the exemplary embodiments described herein provide a frictional damper comprising a split ring and a disk spring arranged against an inner seat of an inner conduit and an outer seat of an outer conduit, respectively. The inner conduit and the outer conduit may be a static part or a rotating part. The frictional damper is designed to provide frictional damping of vibrations at free unsupported ends of the inner conduit and the outer conduit. The outer conduit and the inner conduit are described herein as being applied to a few preferred embodiments, for example, the outer conduit designed as a shell of an inlet duct and the inner conduit designed as a seal support coupled with the outer conduit in a gas turbine. More specifically, the outer conduit and the inner conduit may be integral with a turbine nozzle in the gas turbine. Moreover, the frictional damper comprises at least one slip surface positioned at least between the split ring and the disk spring. The slip surface is perpendicular to an axial direction A (as shown in FIG. 2, extending along a longitudinal length of the outer conduit 400 for reference). The conduit also defines a circumferential direction extending about the axial direction A. The disk spring is pre-tensioned and provides required axial preload. The spring rate of the disk spring is favorably nonlinear, and provides relatively uniform axial force regardless of deflection changes due to thermal growth, wear, or elastic strain, etc. That means the axial force is less sensitive to thermal growth, wear, or elastic strain, etc.

The exemplary embodiment further provides a method of installing a frictional damper. The method comprises: inserting a disk spring onto an inner seat of a inner conduit and the disk spring un-tensioned initially, in an free state; pushing a split ring between an outer seat of a outer conduit and the disk spring until the split ring snaps in place around the disk spring, such that the disk spring is tensioned by the split ring, and the disk spring and the split ring are in an installed state between the inner conduit and the outer conduit; and allowing a relative movement on at least one slip surface to some limit in the installed state, the at least one slip surface positioned at least between the split ring and the disk spring and perpendicular to an axial direction defined by the frictional damper. Specifically, in the installed state, the split ring and the disk spring together act as a seal and provide 360 degree contact with the inner seat of the inner conduit and the outer seat of the outer conduit, while the disk spring can move along a radial direction R (as shown in FIG. 2) relative to the split ring and the inner seat of the inner conduit, thus damp any relative vibratory motion between the inner seat of the inner conduit and the outer seat of the outer conduit.

It is contemplated that the frictional damper, the conduit and the method of installing the frictional damper as described in the specification may have general application in a broad range of systems and/or a variety of commercial, industrial, and/or consumer applications other than damper or conduit of gas turbine engines.

Figure 1:
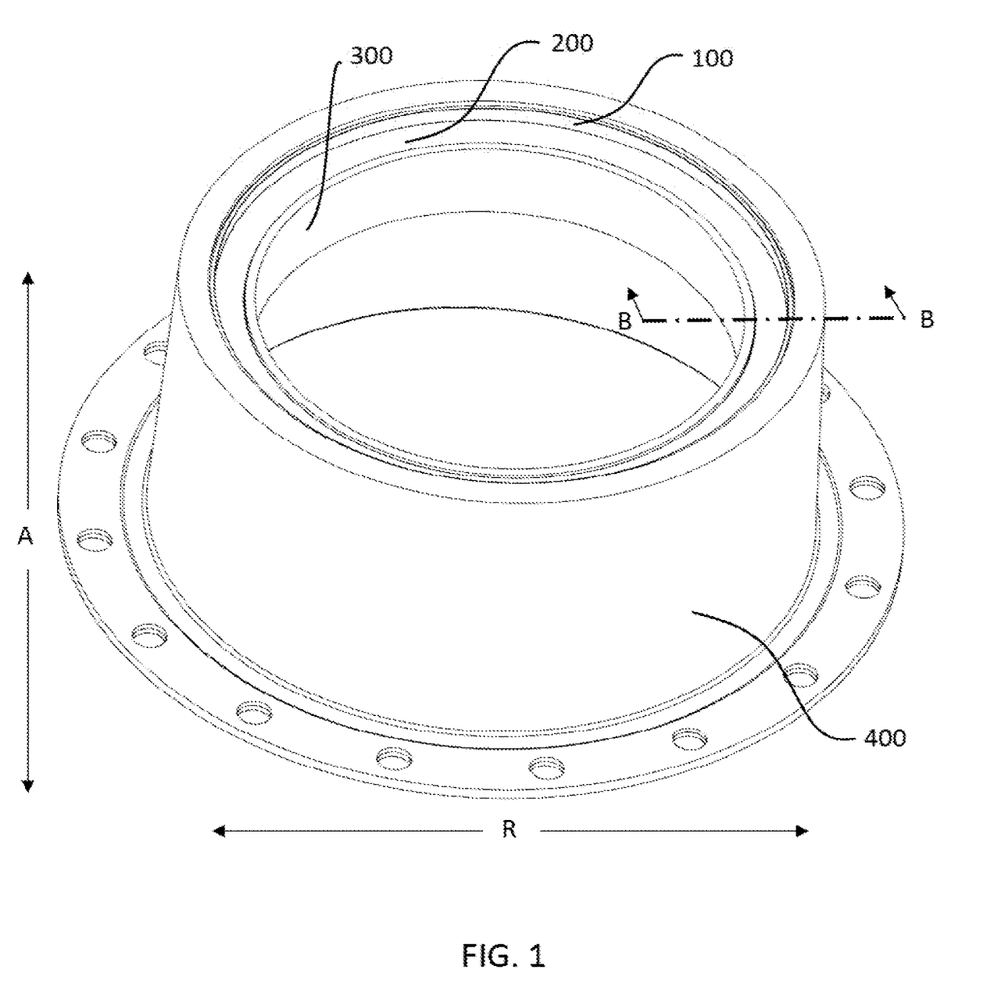
FIG. 1 is a schematic view of a conduit assembly in an exemplary embodiment.

Referring now to the drawings, wherein identical numbers indicated the same elements throughout the figures, FIG. 1 is a top view of a conduit assembly in an exemplary embodiment and FIG. 2 is a cross-sectional view of a portion of the conduit assembly shown in FIG. 1 and taken along line B-B. More particularly, in the exemplary embodiment, the conduit assembly comprises an inner conduit 300 including an inner seat 302, an outer conduit 400 including an outer seat 402, and a frictional damper comprising a split ring 100 and a disk spring 200. In the exemplary embodiment, the inner conduit 300, the outer conduit 400, the split ring 100 and the disk spring 200 each has an outer perimeter that is circular. Meanwhile, the inner conduit 300 is configured as an inner conical cylinder to support the outer conduit. However, in other embodiments, the inner conduit 300, the outer conduit 400, the split ring 100 and the disk spring 200 are not limited to the circular outer perimeter, and can be any structure with non-circular outer perimeter. Those skilled in the art will appreciate that split ring 100 and the disk spring 200 of the present invention can be used in turbomachinery and may also be used in other structures. In one exemplary embodiment, the outer conduit 400 is an annular shell of an inlet duct of a gas turbine and the inner conduit 300 is an annular seal support coupled to the outer conduit 400. The split ring 100 in conjunction with the disk spring 200 is configured as a circumferential seal structure between the inner conduit 300 and the outer conduit 400. In the exemplary embodiment, the split ring 100 and the disk spring 200 are designed to provide frictional damper of vibrations between the inner conduit 300 and the outer conduit 400. Furthermore, the inner conduit 300 and the outer conduit 400 can be used as part of the one selected from: a turbine, a hot or cold section, a bearing area, or a sump area of a gas turbine, or any system or part of machinery including turbomachinery either static or rotating.

As shown in FIG. 2, the inner conduit 300 comprises a first body 301 and the inner seat 302 extends forwardly from the first body 301. The first body 301 is configured as a conical support to couple with the outer conduit 400. The outer conduit 400 comprises an aft end 404 with a plurality of locking holes 403 to lock with an end flange of the inner conduit 300 by fasteners therethrough, a second body 401 extending forwardly from the aft end 404 and the outer seat 402 protruding radially inward from a forward end of the second body 401. In other embodiments, at least one of the art end 404 with the locking holes 403 and the end flange of the inner conduit 300 can be omitted, and then the outer conduit 400 may be integral with an inlet duct (not shown) and the inner conduit (300) act as a seal support without the end flange. Moreover, there is a first groove 303 at a forward end of the inner seat 302 to receive an end portion of the disk spring 200. Desirably, the first groove 303 comprises an arcuate slip surface to allow a relative movement thereon.

Figure 3:
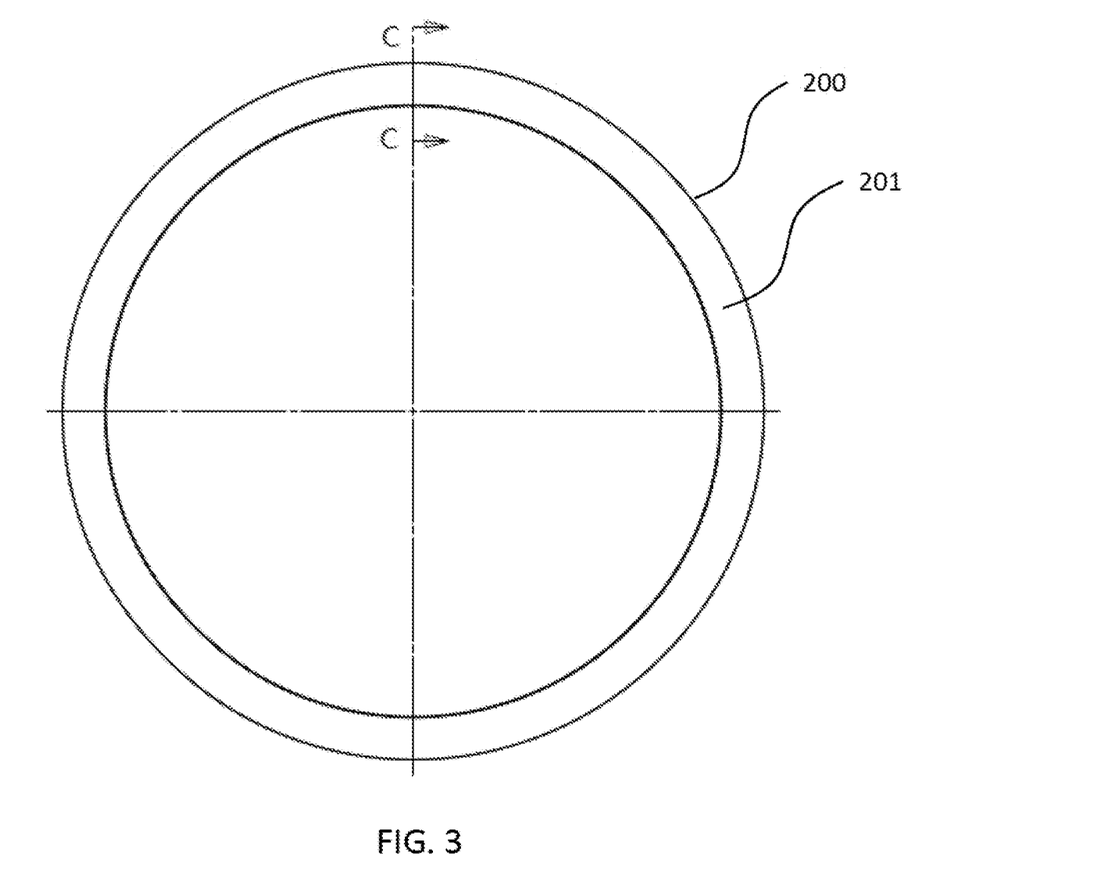
FIG. 3 is a top view of a disk spring in an exemplary embodiment.
Figure 4:
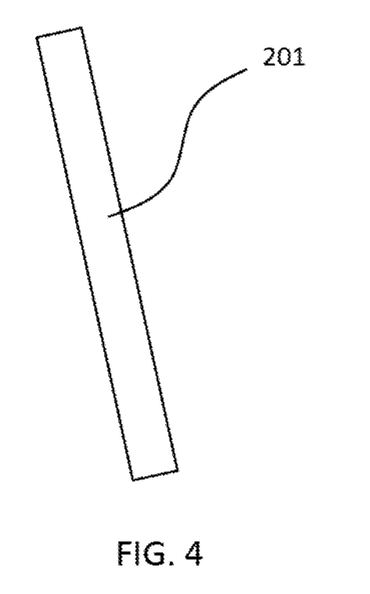
FIG. 4 is a cross-sectional view of a portion of the disk spring shown in FIG. 3 and taken along line C-C.
Figure 5:
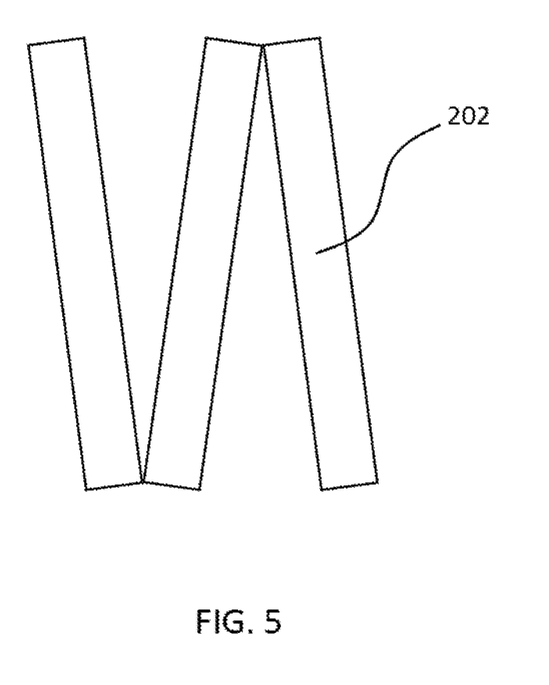
FIG. 5 is a schematic view of a stack of disk springs shown in FIG. 4.

FIG. 3 is a top view of a disk spring in the exemplary embodiment, and FIG. 4 is a cross-sectional view of a portion of the disk spring shown in FIG. 3 and taken along line C-C. In the exemplary embodiment, the disk spring 200 includes a circular body 201 with uniform thickness and width. As those skilled in the art appreciated, the disk spring 200 may be any shape with varying thickness and/or width. Preferably, the disk spring 200 is designed as an annular structure to facilitate installing and/or provide sealing. In other exemplary embodiments, the disk spring 200 includes a stack of disk springs 202, such as three disk springs as shown in FIG. 5, to increase flexibility therein.

Figure 6:
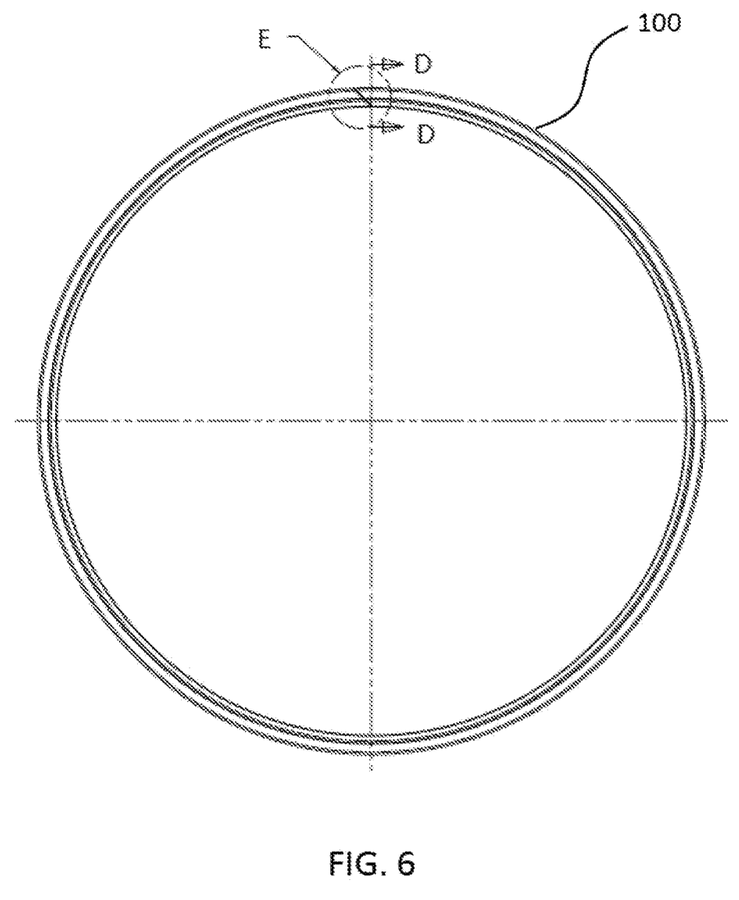
FIG. 6 is a top view of a split ring in an exemplary embodiment.
Figure 7:
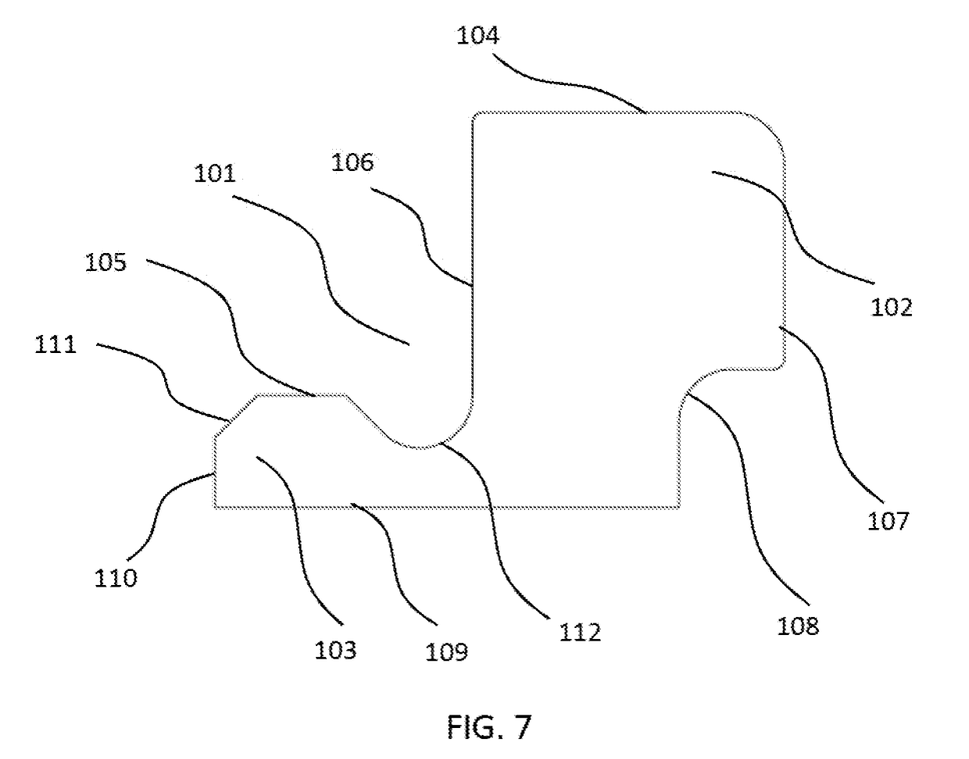
FIG. 7 is a cross-sectional view of a portion of the split ring shown in FIG. 6 and taken along line D-D.
Figure 8:
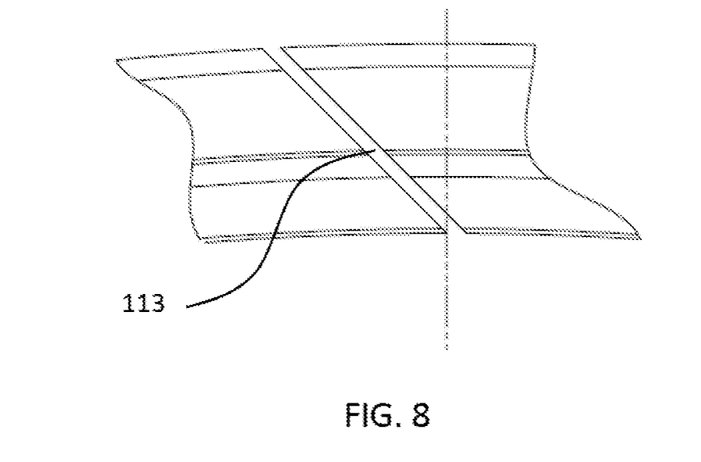
FIG. 8 is an enlarged view of a portion of the split ring shown in FIG. 7 and in circle E.

FIG. 6 is a top view of a split ring in the exemplary embodiment, FIG. 7 is a cross-sectional view of a portion of the split ring shown in FIG. 6 and taken along line D-D, and FIG. 8 is an enlarged view of a portion of the split ring shown in FIG. 5 and in circle E. More specifically, the split ring 100 is configured substantially as a stair-step form to prevent the disk spring 200 and split ring 100 from disengaging. The split ring 100 comprises a higher portion 102 and a lower portion 103 extending from the higher portion 102 forwardly, such that an access 101 is limited by the higher portion 102 and the lower portion 103 to receive the outer seat 402 of the outer conduit 400. The higher portion 102 comprises a second groove 108 opposite to the lower portion 103 at a radially inner distal end thereof to receive an end portion of the disk spring 200, such that the split ring 100 is restrained radially outward by the outer seat 402 of the outer conduit 400 and radially inward by the disk spring 200 (show in FIG. 1). Furthermore, the second groove 108 comprises an arcuate slip surface for allowing a radial movement of the disk spring 200 relative to the split ring 100.

Furthermore, the split ring 100 comprises a higher surface 102, a lower surface 105, a first side wall 106 connecting the higher surface 104 with the lower surface 105, a second side wall 107 opposite to the first side wall 106, a base wall 109 opposite to at least a portion of the higher surface 104, a third side wall 110 connecting the lower surface 105 with the base wall 109. The access 101 is defined by the first side wall 106 and the lower surface 105. The second channel 17 is arranged to connect the second side wall 16 with the base wall 18. In a preferable exemplary embodiment, the split ring 100 comprises a recess section 112 connecting the first side wall 106 with the lower surface 105 to provide reliable contact between the split ring 100 and the outer seat 402 of the outer conduit 400. In other exemplary embodiments, the recess section 112 may be any cut features for avoiding a sharp corner between the first side wall 106 and the lower surface 105. The split ring 100 further comprises an inclined surface 111 connecting the lower surface 106 with the third side wall 110 to prevent the split ring 100 from moving forwardly too far to engage with the disk spring 200.

As shown in FIG. 8, an enlarged view of a portion of the split ring shown in FIG. 6 and in circle E, the split ring 100 comprises a gap 113 cut at an angle therein to facilitate the installing of the split ring 100 between the outer seat 402 of the outer conduit 400 and the disk spring 200. More particularly, the gap 113 in the split ring 100 at an angle may be sized very small to reduce leakages and act as a seal.

Figure 9:
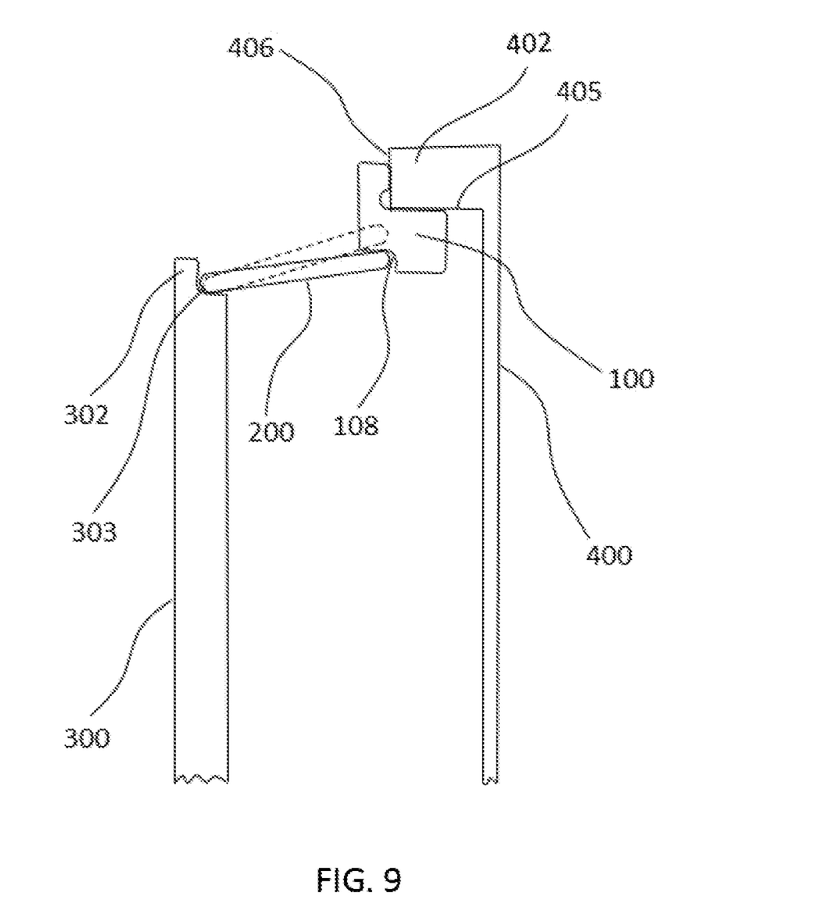
FIG. 9 is a schematic view of a disk spring of a frictional damper in a free state and in an installed state.

As shown in FIG. 9, in conjunction with FIG. 7 and FIG. 1, a schematic view of the disk spring 200 in a free state and in an installed state. When the disk spring 200 is in a free state, as dash line in FIG. 9, there is a radial distance between an inner wall 406 of the outer conduit 400 and a tip end of the disk spring 200, and then outer diameter of the disk spring 200 is lower than inner diameter of the outer seat 402 of the outer conduit 400 to allow the disk spring 100 to be inserted between the inner conduit 400 and the disk spring 200. In installed state, the disk spring 200 is tensioned by the split ring 100. Specifically, one end portion of the disk spring 200 is tensioned by and engages with the split ring 100 in the second groove 108 thereof, while the other end portion of the disk spring 200 engages with the inner seat 302 in the first groove 303 thereof, and then the split ring 100 is clamped between the disk spring 200 and the outer seat 402 of the outer conduit 400, such that the first side wall 106 of the split ring 100 engages with a lateral wall 405 of the outer seat 402 and the lower surface 105 of the split ring 100 engages with the inner wall 406 of the outer seat 402. In the installed state, the disk spring 200 may move radially to damping vibrations between the outer conduit 400 and the inner conduit 300. More specifically, when the inner conduit 300 and/or the outer conduit 400 vibrate and move relative to each other, there is a relative radial movement between any of the outer conduit 400, the inner conduit 300, the disk spring 200 and the split ring 100, due to the presence of the disk spring 200 and the split ring 100. Since the outer conduit 400, the inner conduit 300, the disk spring 200 and the split ring 100 are coupled together by an axial force from the disk spring 200, any of the relative radial movement results in a frictional damping.

Figure 10:
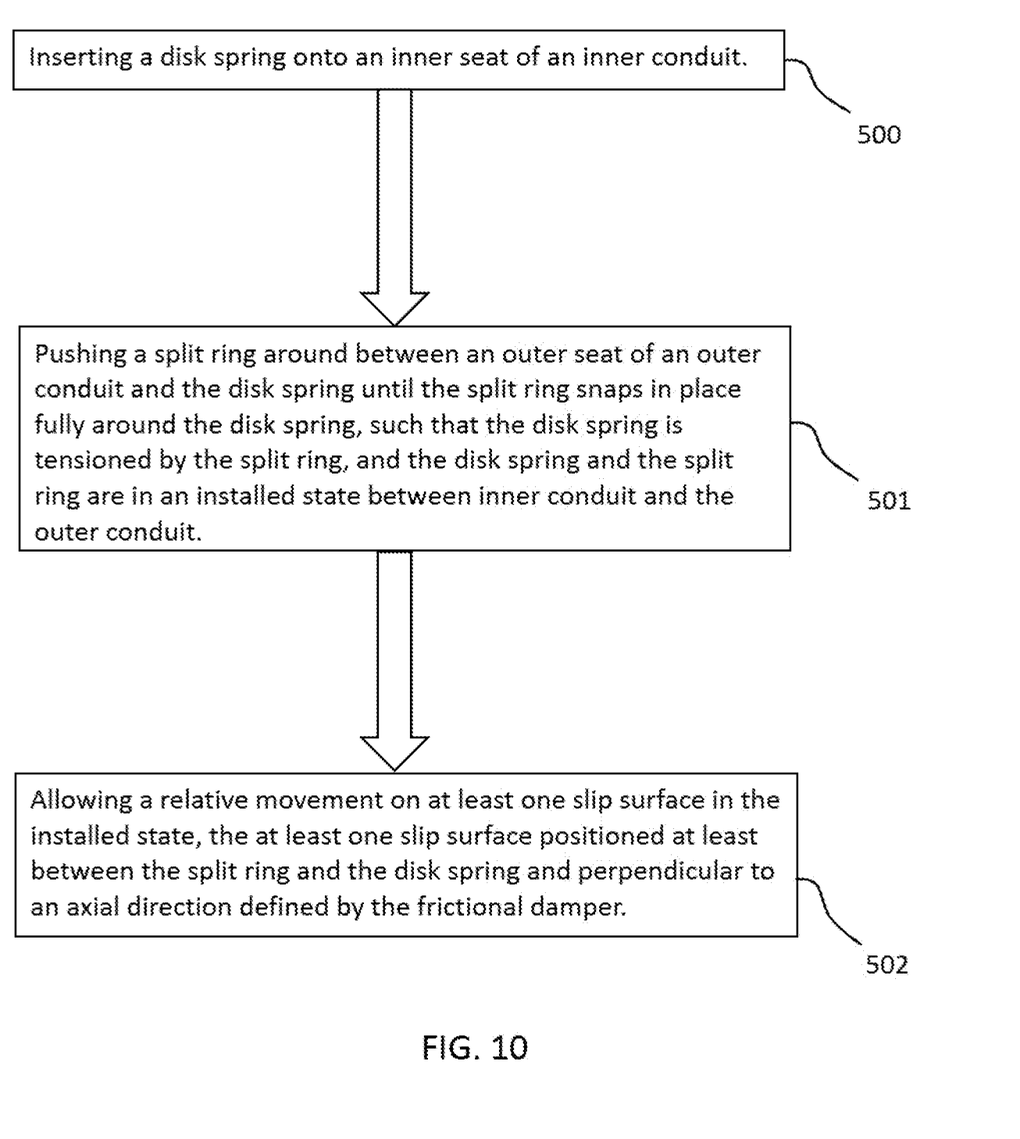
FIG. 10 is a flowchart of a method of installing a frictional damper in an exemplary embodiment.

Referring to FIG. 10, a method of installing the frictional damper is provided. The method comprises: at 500, inserting a disk spring 200 onto an inner seat 302 of an inner conduit 300; at 501, pushing a split ring 100 around between an outer seat 402 of an outer conduit 400 and the disk spring 200 until the split ring 100 snaps in place fully around the disk spring 100, such that the disk spring 200 is tensioned by the split ring 100, and then the disk spring 200 and the split ring 100 are in an installed state between the inner conduit 300 and the outer conduit 400; at 52, allowing a relative movement on at least one slip surface in the installed state, the at least one slip surface positioned at least between the split ring 100 and the disk spring 200 and perpendicular to an axial direction defined by the frictional damper. Moreover, the method further comprises providing a slip surface between the outer seat 402 of the outer conduit 400 and the split ring 100, and/or a slip surface between the disk spring 200 and the inner seat 302 of the inner conduit 100 to allow a relative movement on the slip surfaces. Preferably, the mothed comprises closing a gap cut at an angle in the split ring when the split ring snaps in place fully around the disk spring. Specifically, in installing, as shown in FIG. 7 and FIG. 9, the second side wall 107 (referring to FIG. 7) of the split ring 100 presses the disk spring 200 downwardly until there is a sufficient gap between the outer seat 402 of the outer conduit 400 and the disk spring 200, and then the higher portion 102 of the disk spring 100 goes outwardly through the gap until the first side wall 105 and the lower surface 105 of the split ring 100 couple with the outer seat 402 of the outer conduit 400, then the disk spring is tensioned by the split ring and the gap in the split ring 100 is closed.

The above-described frictional damper may be used with turbomachinery or other structures. Different from the known frictional dampers, the frictional damper in the exemplary embodiment including two parts, the split ring and the disk spring as described above. The two parts are easy to install, low costs, and may be installed without a need to modify the exciting hardware. Moreover, the disk spring rate characteristic is favorably nonlinear, providing uniform axial load regardless of deflection changes due to thermal growth, wear, or elastic strain, such that the frictional damper in the exemplary embodiment may maintain significant damping in a vibrating environment.

Exemplary embodiments of the frictional damper, the conduit assembly and a method of installing the frictional damper are described above in detail. The frictional damper, the conduit assembly and a method of installing the frictional damper are not limited to the specific embodiments described herein, for example, the frictional damper and the method for the same may also be used in combination with other machines and methods, and can be implemented and utilized in conjunction with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, and also to enable those skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A frictional damper, comprising:
    a split ring, configured substantially as a stair-step form, the split ring comprising a larger outer diameter portion and a smaller outer diameter portion extending from the larger outer diameter portion forwardly, such that an access is defined by the larger outer diameter portion and the smaller outer diameter portion, and wherein the larger outer diameter portion comprises a groove opposite to the smaller outer diameter portion at a radially inner distal end thereof; and a disk spring configured to be against the split ring and tensioned by the split ring in an installed state.

2. The frictional damper of claim 1, wherein the disk spring comprises a stack of disk springs.

3. The frictional damper of claim 1, wherein the split ring comprises a gap cut at an angle therein.

4. The frictional damper of claim 1, wherein the disk spring has a nonlinear spring rate to provide a uniform axial force.

5. The frictional damper of claim 1, wherein the disk spring is configured to be able to move radially relative to the split ring in the installed state.

6. The frictional damper of claim 1, wherein the groove comprises an arcuate slip surface for allowing a radial movement of the disk spring relative to the split ring in the installed state.

7. The frictional damper of claim 1, wherein the split ring comprises a first side wall connecting the larger outer diameter portion with the smaller outer diameter portion, a second side wall opposite to the first side wall, a base wall opposite to at least a portion of the larger outer diameter portion, a third side wall connecting the smaller outer diameter portion with the base wall and the groove arranged to connect the second side wall with the base wall, wherein an access is defined by the first side wall and the smaller outer diameter portion.

8. The frictional damper of claim 7, wherein the split ring comprises a recess section connecting the first side wall with the smaller outer diameter portion.

9. The frictional damper of claim 7, wherein the split ring comprises an inclined surface connecting the smaller outer diameter portion with the third side wall.

10. The frictional damper of claim 1, wherein the frictional damper comprises at least one slip surface perpendicular to an axial direction defined by the frictional damper, and wherein the at least one slip surface is located at least between the split ring and the disk spring.

11. The frictional damper of claim 1, wherein the split ring and the disk spring are arranged together to contact with an outer conduit and an inner conduit of an inlet duct of a gas turbine and be configured as a seal.

12. A method of installing the frictional damper of claim 1, the frictional damper having a split ring and a disk spring, the method comprising:
inserting the disk spring onto an inner seat of an inner conduit;
pushing the split ring around between an outer seat of an outer conduit and the disk spring until the split ring snaps in place fully around the disk spring, such that the disk spring is tensioned by the split ring, and the disk spring and the split ring are in an installed state between the inner conduit and the outer conduit.

13. The method of claim 12 comprising, allowing a relative movement of the disk spring on at least one slip surface in the installed state, the at least one slip surface positioned at least between the split ring and the disk spring and perpendicular to an axial direction defined by the frictional damper, and arranging the split ring and the disk spring to provide a substantially 360 degree contact with the outer seat of the outer conduit and the inner seat of the inner conduit, respectively.

14. The method of claim 12 comprising, closing a gap cut at an angle in the split ring when the split ring snaps in place fully around the disk spring.

15. The method of claim 12, wherein, when installing, a second side wall of the larger outer diameter portion presses the disk spring downwardly until there is a sufficient gap between the outer seat of the outer conduit and the disk spring, and then the larger outer diameter portion of the disk spring goes outwardly through the gap until a first side wall opposite to the second side wall and a smaller outer diameter surface of the smaller outer diameter portion couple with the outer seat of the outer conduit, then the disk spring is tensioned by the split ring in the installed state.

16. A frictional damper, comprising:
a split ring comprising a larger outer diameter surface, a smaller outer diameter surface, a first side wall connecting the larger outer diameter surface with the smaller outer diameter surface, a second side wall opposite to the first side wall, a base wall opposite to at least a portion of the larger outer diameter surface, a third side wall connecting the smaller outer diameter surface with the base wall and a groove arranged to connect the second side wall with the base wall, wherein an access is defined by the first side wall and the smaller outer diameter surface; and
a disk spring configured to be against the split ring and tensioned by the split ring in an installed state.

17. The frictional damper of claim 16, wherein the disk spring comprises a stack of disk springs.

18. The frictional damper of claim 16, wherein the split ring comprises a gap cut at an angle therein.

19. The frictional damper of claim 16, wherein the disk spring has a nonlinear spring rate to provide a uniform axial force.

20. The frictional damper of claim 16, wherein the disk spring is configured to be able to move radially relative to the split ring in the installed state.

21. The frictional damper of claim 16, wherein the frictional damper comprises at least one slip surface perpendicular to an axial direction defined by the frictional damper, and wherein the at least one slip surface is located at least between the split ring and the disk spring.

22. The frictional damper of claim 16, wherein the split ring and the disk spring are arranged together to contact with an outer conduit and an inner conduit of an inlet duct of a gas turbine and be configured as a seal.

* * * * *